(12) United States Patent
Suzuki

(10) Patent No.: US 8,493,189 B2
(45) Date of Patent: Jul. 23, 2013

(54) HAPTIC FEEDBACK CONTROLLER

(75) Inventor: Takahiko Suzuki, Nagano (JP)

(73) Assignees: Fukoku Co., Ltd., Saitama Pref. (JP); Pro-Tech Design Corporation, Nagano (JP)

( * ) Notice: Subject to any disclaimer, the term of this patent is extended or adjusted under 35 U.S.C. 154(b) by 733 days.

(21) Appl. No.: 12/521,254

(22) PCT Filed: Dec. 25, 2007

(86) PCT No.: PCT/JP2007/074879
§ 371 (c)(1),
(2), (4) Date: Jun. 25, 2009

(87) PCT Pub. No.: WO2008/078753
PCT Pub. Date: Jul. 3, 2008

(65) Prior Publication Data
US 2010/0097198 A1  Apr. 22, 2010

(30) Foreign Application Priority Data

Dec. 25, 2006 (JP) ................................ 2006-348701

(51) Int. Cl.
*G08B 6/00* (2006.01)
(52) U.S. Cl.
USPC ............... 340/407.2; 340/825.9; 345/156; 345/173; 715/702; 715/701
(58) Field of Classification Search
USPC ............... 340/407.2, 825.9; 345/156, 173, 345/174; 715/702, 701
See application file for complete search history.

(56) References Cited

U.S. PATENT DOCUMENTS 6,657,614 B1 * 12/2003 Ito et al. .................. 345/168
7,336,266 B2 * 2/2008 Hayward et al. ............ 345/179
(Continued)

FOREIGN PATENT DOCUMENTS

JP   11-146674 A   5/1999
JP   11-195353 A   7/1999
(Continued)

OTHER PUBLICATIONS

M. Biet et al., "New Tactile Devices Using Piezoelectric Actuators," p. 989-p. 992 of Actuator 2006, 10th International Conference on New Actuators, Jun. 14-16, 2006, Bremen, Germany.
International Search Report of Application No. PCT/JP2007/074879 mailed Jan. 22, 2008.

*Primary Examiner* — Hai Phan
*Assistant Examiner* — Hongmin Fan
(74) *Attorney, Agent, or Firm* — Lowe Hauptman Ham & Berner, LLP

(57) ABSTRACT

A haptic feedback controller of the present invention includes: a pointing position detecting sensor which is arranged along a fingertip pointing path and detects a pointing position of a fingertip when a pointing operation is performed along the fingertip pointing path; a haptic feedback imparting device which has a piezoelectric element arranged along the fingertip pointing path and generates vibrations depending on a high frequency voltage when the voltage is applied thereto and an elastic body which is fixed to the piezoelectric element, and imparts predetermined haptic feedback to the fingertip due to vibrations generated by the piezoelectric element; and a piezoelectric element control device which controls the piezoelectric element based on feedback information outputted from controlled equipment. According to the present invention, it is possible to provide a haptic feedback controller which is suitable for controlling controlled equipment in response to a pointing operation performed by a user with his/her fingertip and, at the same time, is suitable for equipment such as portable equipment deemed necessary to satisfy demand for reduction of thickness and miniaturization.

16 Claims, 8 Drawing Sheets

U.S. PATENT DOCUMENTS

| | | | |
|---|---|---|---|
| 7,355,595 B2* | 4/2008 | Bathiche et al. | 345/173 |
| 8,022,935 B2* | 9/2011 | Hotelling | 345/173 |
| 2006/0255683 A1 | 11/2006 | Suzuki et al. | |
| 2008/0079604 A1* | 4/2008 | Madonna et al. | 340/825.72 |
| 2008/0115084 A1* | 5/2008 | Scott | 715/810 |

FOREIGN PATENT DOCUMENTS

| | | |
|---|---|---|
| JP | 3085481 U | 2/2002 |
| WO | 2006/051581 A1 | 5/2006 |

* cited by examiner

HAPTIC FEEDBACK CONTROLLER

RELATED APPLICATIONS

The present application is based on International Application Number PCT/JP2007/074879, filed Dec. 25, 2007 and claims priority from, Japanese Application Number 2006-348701, filed Dec. 25, 2006, the disclosures of which are hereby incorporated by reference herein in their entirety.

TECHNICAL FIELD

The present invention relates to a haptic feedback controller.

BACKGROUND ART

FIG. 9 is a constitutional view showing one example of a conventional haptic feedback controller (see patent document 1, for example). FIG. 9A is a perspective view showing appearance of the haptic feedback controller 500, and FIG. 9B is an exploded perspective view of the haptic feedback controller 500. Further, FIG. 10 is a block diagram for explaining functions of the conventional haptic feedback controller 500.

The haptic feedback controller 500 includes, as shown in FIG. 9, a base 510, a cap 520 and a piezoelectric motor 530.

The base 510 has a ring shape, and the cap 520 has a ring shape in the same manner as the base 510 and is mounted on the base 510 in a rotatable manner relative to the base 510.

The piezoelectric motor 530 is, as shown in FIG. 9B, arranged between the base 510 and the cap 520. The piezoelectric motor 530 includes a ring-shaped stator 540 and a ring-shaped rotor 550.

The haptic feedback controller 500 having such constitutional elements further includes, as shown in FIG. 10, a rotation control device 610 which controls a rotational state of the piezoelectric motor 530, a rotational state detection device 620 which detects a rotational state of a cap 520 relative to the base 510, an input/output device 630 which has a function of outputting rotational state information based on a detection result of the rotational state detection device 620 to, for example, a personal computer (hereinafter referred to as PC) 700 which constitutes controlled equipment and a function of receiving feedback information for controlling a piezoelectric motor outputted from the PC 700, and a control part 640 which performs a control of the rotational control device 610, the rotational state detection device 620 and the input/output device 630.

The haptic feedback controller 500 can be used in the following manner.

A user, first of all, rotates the cap 520. Then, the rotational state detection device 620 detects a rotational state of the cap 520 relative to the base 510, and outputs a detection result to the control part 640. The control part 640 outputs rotational state information based on the detection result of the rotational state detection device 620 to the PC 700 via the input/output device 630 so that the PC 700 performs a necessary control.

Here, the PC 700 outputs, based on the rotational state information and a state of an application operated in the PC, feedback information used for controlling a rotational state of the piezoelectric motor 530 to the haptic feedback controller 500. The input/output device 630 receives inputting of feedback information from the PC 700 and, at the same time, outputs the feedback information to the control part 640. The control part 640 outputs the feedback information to the rotation control device 610 thus performing a rotational control of the piezoelectric motor 530.

In such a haptic feedback controller 500 having such a constitution, when a user operates the cap 520, haptic feedback is imparted to the piezoelectric motor 530 and, eventually, to the cap 520 in response to such an operation.

Further, the piezoelectric motor 530 which the haptic feedback controller 500 includes exhibits excellent response characteristic, can change over the rotational direction at a high speed, and exhibits high resolution in operation along the rotational direction. Accordingly, the user can easily acquire simple-to-control and gentle haptic feedback and hence, the user can operate the cap 520 smartly or skillfully thus allowing the haptic feedback controller 500 to possess versatile expressive powers on haptic feedback.

Patent document 1: International Publication WO2006/051581.

DISCLOSURE OF THE INVENTION

Problems that the Invention is to Solve

As described above, the technique disclosed in patent document 1 possesses various advantages as the haptic feedback controller. However, there may be cases where further improvements of the technique become necessary depending on intended uses.

That is, the conventional haptic feedback controller 500 is configured such that controlled equipment is controlled when a user operates the cap 520 by gripping and rotating the cap 520 with his/her hand. Accordingly, for example, such a haptic feedback controller 500 may not be suitable for an application where a user controls equipment while feeling fine or delicate haptic feedback with his/her fingertip. Further, when the haptic feedback controller 500 is used in a mode where the haptic feedback controller 500 is incorporated into the controlled equipment, the cap 520 projects from an operation surface of the equipment. Accordingly, the presence of the cap 520 becomes an obstacle in equipment such as portable equipment deemed necessary to satisfy demand for reduction of thickness and miniaturization.

The present invention has been made to overcome the above-mentioned drawbacks, and it is an object of the present invention to provide a haptic feedback controller which is suitable for controlling controlled equipment in response to a pointing operation performed by a user with his/her fingertip and, at the same time, is suitable for equipment such as portable equipment deemed necessary to satisfy demand for reduction of thickness and miniaturization.

Means for Solving the Problems (1) The present invention is directed to a haptic feedback controller capable of controlling controlled equipment in response to a pointing operation which a user performs with his/her fingertip along a predetermined fingertip pointing path, and capable of imparting haptic feedback corresponding to the pointing operation to the fingertip, wherein the haptic feedback controller includes: a pointing position detecting sensor which is arranged along the fingertip pointing path and is configured to detect a pointing position of the fingertip when the pointing operation is performed; a haptic feedback imparting device which is arranged along the fingertip pointing path, includes the piezoelectric element which generates vibrations corresponding to a high frequency voltage when the high frequency voltage is applied to the piezoelectric element and an elastic body which is fixed to the piezoelectric element, and is configured to impart predetermined haptic feedback to the fingertip due to the vibrations generated by the piezoelectric element; and a piezoelectric element control device which is configured to control the piezoelectric element based on feedback information outputted from the controlled equipment.

The haptic feedback controller of the present invention can be preferably used as a controller which controls controlled equipment in response to a pointing operation of a user with his/her fingertip. Further, different from a haptic feedback controller which a user operates by gripping a cap with his/her hand, the haptic feedback controller of the present invention has no projecting portions and hence, it is possible to make an operation surface on which the haptic feedback controller is mounted flat. Accordingly, it is possible to provide a haptic feedback controller which is suitable for portable equipment deemed necessary to satisfy demand for reduction of thickness and miniaturization.

Further, the haptic feedback controller of the present invention is of a type which imparts haptic feedback to the fingertip using the principle of piezoelectric motor and hence, the present invention can provide the haptic feedback controller which makes use of advantageous features of the piezoelectric motor such as excellent response characteristics, and high movement resolution along the fingertip pointing direction.

(2) In the haptic feedback controller having the constitution (1), the pointing position detecting sensor may preferably be an electrostatic capacitance sensor which is fixedly mounted on the elastic body, and is configured to detect the pointing position of the fingertip when the pointing operation is performed in a state that the fingertip is in contact with the pointing position detecting sensor.

With the use of the electrostatic capacitance sensor as the pointing position detecting sensor, the position of the fingertip which performs the pointing operation on the fingertip pointing path can be properly detected. Further, the electrostatic capacitance sensor can be formed into a thin plate shape and hence, a total thickness of the haptic feedback controller can be decreased whereby it is possible to provide the haptic feedback controller suitable for portable equipment deemed necessary to satisfy demand for reduction of thickness and miniaturization.

(3) In the haptic feedback controller having the constitution (1), the pointing position detecting sensor may preferably be a pressure sensitive sensor which is fixedly mounted on the elastic body, and is configured to detect the pointing position of the fingertip when the pointing operation is performed in a state that the fingertip is in contact with the pointing position detecting sensor.

In this manner, it is possible to use the pressure sensitive sensor as the pointing position detecting sensor. With the use of the pressure sensitive sensor as the pointing position detecting sensor, the position of the fingertip which performs the pointing operation on the fingertip pointing path can be properly detected. Further, the pressure sensitive sensor can be formed into the shape of a thin plate in the same manner as the electrostatic capacitance sensor and hence, a total thickness of the haptic feedback controller can be decreased whereby it is possible to provide the haptic feedback controller which is suitable for portable equipment deemed necessary to satisfy demand for reduction of thickness and miniaturization.

(4) In the haptic feedback controller having the constitution (1), the pointing position detecting sensor may preferably be a photo sensor which is configured to optically detect the fingertip when the pointing operation is performed.

Also with the use of such a photo sensor, the position of the fingertip can be properly detected.

(5) In the haptic feedback controller having any one of the constitutions (1) to (4), the haptic feedback controller may preferably further include an input/output device which has a function of outputting pointing position information based on the pointing position detected by the pointing position detecting sensor to the controlled equipment and a function of receiving the feedback information outputted from the controlled equipment.

As a matter of course, the haptic feedback controller of the present invention is incorporated into controlled equipment or into other controller for controlling the controlled equipment at a time of manufacturing or shipping the controlled equipment. On the other hand, since the haptic feedback controller of the present invention has such an input/output device, the haptic feedback controller may be provided as a part separate from the controlled equipment or the other controller for controlling the controlled equipment, and is connected to the controlled equipment for controlling the controlled equipment when necessary.

(6) In the haptic feedback controller having any one of the constitutions (1) to (5), the haptic feedback which the haptic feedback imparting device imparts to the fingertip may preferably include at least one haptic feedback selected from a group consisting of haptic feedback which guides the fingertip in the predetermined direction along the fingertip pointing path, haptic feedback which imparts feeling of resistance to movement of the fingertip when the fingertip is moved in the predetermined direction along the fingertip pointing path, and haptic feedback which informs the user of a fact that the fingertip points a predetermined position on the fingertip pointing path by way of his/her fingertip.

Such haptic feedback also assists an operation of the controller by a user and hence, the user can surely and smoothly perform a control of the controlled equipment.

For example, since the haptic feedback which guides the fingertip in the predetermined direction along the fingertip pointing path is imparted to the fingertip, when the user puts his/her fingertip on the haptic feedback controller, the fingertip is naturally guided in the predetermined direction so that the user can easily operate the haptic feedback controller. Further, since the haptic feedback which gives feeling of resistance to the movement of the fingertip is imparted to the fingertip, the user can perceive a tactile stimuli (sense of touch) which makes the further pointing operation of the fingertip difficult and hence, the user acquires an operation state of the controlled equipment or a degree of his/her operation of the haptic feedback controller such as an operation state that the desired operation is coming close to the end.

Further, since the haptic feedback which informs the user of a fact that the fingertip points a predetermined position on the fingertip pointing path is imparted to the fingertip, the user can confirm that the predetermined operation is properly performed. As the haptic feedback which informs the user of the fact that the fingertip points the predetermined position on the fingertip pointing path, a sense of touch such as "minute wiggling vibrations" or "minute clicking vibrations" may be exemplified, for example. By imparting such haptic feedback controller to the fingertip at the predetermined position, the user can confirm that the predetermined operation is properly performed and hence, the user can acquire confidence on his/her operation.

(7) In the haptic feedback controller having any one of the constitutions (1) to (6), the fingertip pointing path may preferably be formed into an annular shape, and the piezoelectric element and the elastic body may preferably be formed into an annular shape corresponding to the fingertip pointing path.

By forming the fingertip pointing path into an annular shape, the operation at the time of controlling controlled equipment becomes a pointing operation in which the fingertip draws a circle along the annular fingertip pointing path and hence, a user can perform the pointing operation with operation feeling similar to operation feeling experienced at the time of rotating a rotary-type operation tabmounted on generally-used equipment.

(8) In the haptic feedback controller having any one of the constitutions (1) to (7), the fingertip pointing path may preferably be formed linearly, and the piezoelectric element and the elastic body may preferably be formed linearly corresponding to the fingertip pointing path.

By forming the fingertip pointing path linearly, the operation at the time of controlling controlled equipment becomes a pointing operation which slides the fingertip linearly along the linear fingertip pointing path and hence, a user can perform the pointing operation with operation feeling similar to operation feeling obtained at the time of sliding a slide-type operation tab mounted on equipment used in general in the lateral direction or in the vertical direction.

Here, the term "linear" is not limited to a straight line and, for example, the term "linear" includes other shape such as "arcuate" or "corrugated".

(9) In the haptic feedback controller having any one of the constitutions (1) to (8), the fingertip pointing path may preferably be formed on an upper end surface of the elastic body, and the pointing position detecting sensor may preferably be fixed to the upper end surface of the elastic body.

By forming the fingertip pointing path on the upper end of the elastic body, the haptic feedback controller of the present invention is preferably applicable to a case where the haptic feedback controller of the present invention is used in a state that the feedback controller is mounted on a planar operation panel of controlled equipment or the like. That is, when the haptic feedback controller of the present invention is mounted on the planar operation panel, the fingertip pointing path is formed on the operation panel surface in a substantially coplanar manner and hence, the user can perform a control of the controlled equipment on the operation panel.

(10) In the haptic feedback controller having any one of the constitutions (1) to (9), the fingertip pointing path may preferably be formed on a side surface of the elastic body, and the pointing position detecting sensor may preferably be fixed to the side surface of the elastic body.

By forming the fingertip pointing path on the side surface of the elastic body, the haptic feedback controller of the present invention is preferably applicable to a disc-shaped or cylindrical equipment controller or the like, for example.

That is, when the haptic feedback controller of the present invention is mounted on the disc-shaped equipment controller, for example, it is possible to form the fingertip pointing path along the circumferential direction of the side surface of the disc-shaped equipment controller. Accordingly, in performing a control of controlled equipment using a disc-shaped equipment controller, the user can perform the pointing operation on the side surface of the disc-shaped equipment controller. In this manner, also by arranging the fingertip pointing path on the side surface of the elastic body, it is possible to provide the convenient haptic feedback controller depending on the intended use. Further, the fingertip pointing path may be formed on both the upper end surface and the side surface of the elastic body.

(11) In the haptic feedback controller having any one of the constitutions (1) to (10), the haptic feedback controller may preferably further include a pressure sensitive sensor which detects a pressure when a user applies the pressure to the pressure sensitive sensor for performing a pointing operation at a predetermined position on the fingertip pointing path, and outputs a signal corresponding to the applied pressure.

With the provision of such a pressure sensitive sensor, in performing the pointing operation, the user can impart a kind of command to the haptic feedback controller by pushing the pressure sensitive sensor with his/her fingertip and hence, operability is further enhanced. As such a command, for example, a command which determines a selected menu when the menu selection is performed or the like may be exemplified.

BEST MODE FOR CARRYING OUT THE INVENTION

A haptic feedback controller according to the present invention is explained hereinafter in conjunction with embodiments shown in the drawings. The haptic feedback controller of the present invention is a haptic feedback controller capable of controlling controlled equipment in response to a pointing operation which a user performs with his/her fingertip along a predetermined fingertip pointing path and capable of imparting haptic feedback corresponding to the pointing operation to the fingertip. In the embodiments explained hereinafter, the fingertip pointing path is a path of a circle which is drawn along the circumference of a circle having a predetermined diameter.

Embodiment 1

FIG. 1 is a view for explaining the haptic feedback controller 100 according to the embodiment 1. FIG. 1A is a plan view of the haptic feedback controller 100, FIG. 1B is a side view of the haptic feedback controller 100, and FIG. 1C is a perspective view of the haptic feedback controller 100.

FIG. 2 is an exploded perspective view for explaining the haptic feedback controller 100 according to the embodiment 1.

The haptic feedback controller 100 according to the embodiment 1 includes, as shown in FIG. 1 and FIG. 2, a disc-shaped base 110, a disc-shaped haptic feedback imparting device 120 which is fixed to the disc-shaped base 110 and imparts haptic feedback to a fingertip of a user, a pointing position detecting sensor 130 such as an electrostatic capacitance sensor which is fixed to the haptic feedback imparting device 120 and detects a pointing position of the fingertip on the fingertip pointing path, and a pressure sensitive sensor 140 which is fixed to a lower surface of the base 110 (a surface of the base 110 on a side opposite to a mounting surface of the haptic feedback imparting device 120) of the base 110, detects a pressure when a user applies the pressure for performing any operational pointing (for example, pointing for selecting a selection item or the like) at a predetermined position on the fingertip pointing path, and outputs information corresponding to the applied pressure (selected pointing information).

The haptic feedback imparting device 120 includes a ring-shaped piezoelectric element 121 which generates vibrations corresponding to an applied high frequency voltage when a predetermined high frequency voltage is applied to the piezoelectric element 121, and a ring-shaped elastic body 122 which is fixed to the piezoelectric element 121. The elastic body 122 plays a role of transmitting vibrations of the piezoelectric element 121 to a fingertip by way of the pointing position detecting sensor 130 when the piezoelectric element 121 is vibrated. Here, a large number of grooves are formed in the elastic body 122 at predetermined intervals as shown in FIG. 1 thus forming the elastic body 122 into a comb shape consisting of projecting portions 122a and recessed portions 122b.

The haptic feedback imparting device 120 is fixed to the base 110 by way of a base mounting plate 123. That is, screw holes 123a are formed in the base mounting plate 123 at a plurality of positions, and the piezoelectric element 121 can be fixed to the base 110 by fixing the base mounting plate 123 to the base 110 using bolts (not shown in the drawing).

As shown in an enlarged view of a portion surrounded by a broken-line frame F in FIG. 1C, the pointing position detecting sensor 130 includes a large number of position detecting electrodes 130a for detecting a fingertip position (hereinafter, simply referred to as electrodes 130a). These respective electrodes 130a are provided corresponding to the projecting portions 122a of the elastic body 122, and a gap 130b formed between the neighboring electrodes is provided at a position corresponding to the recessed portion 122b of the elastic body 122. Upper sides of these respective electrodes 130a and the gaps 130b are covered with a surface member 131 formed of a thin film. Accordingly, the pointing position detecting sensor 130 has a planar shape in appearance as shown in FIG. 1.

By constituting the elastic body 122 and the pointing position detecting sensor 130 described above, it is possible to efficiently transmit vibrations of the piezoelectric element to the fingertip. The efficient transmission of the vibrations of the piezoelectric element to the fingertip implies that the vibrations of the piezoelectric element can be reduced such that the vibrations become small in amount and hence, the piezoelectric element can be driven with small power consumption thus also contributing to power saving.

Further, each electrode 130a of the pointing position detecting sensor 130 includes a position detecting signal output terminal 130c for outputting a signal for pointing position detection. A position detection signal outputted from the predetermined electrode 130a by way of the position detecting signal output terminal 130c is transmitted to a control part 180 shown in FIG. 3. Accordingly, the control part 180 can generate, based on the position detecting signal outputted from the predetermined electrode 130a, pointing position information indicative of a position which is pointed by the fingertip.

The haptic feedback controller 100 according to the embodiment 1 has, as shown in FIG. 1 and FIG. 2, disc-shaped appearance, and an outer diameter of the haptic feedback controller 100 is set to a value which falls within a range approximately from 20 mm to 120 mm, for example.

FIG. 3 is a block diagram for explaining functions of the haptic feedback controller 100 according to the embodiment 1. The haptic feedback controller 100 according to the embodiment 1 further includes, as shown in FIG. 3, a piezoelectric element control device 160 which controls vibrations of the piezoelectric element 121, an input/output device 170 which performs inputting/outputting of information between a control part 310 of controlled equipment (referred to as a controlled equipment-side control part 310) and the input/output device 170, a control part 180 which has a function of controlling the piezoelectric element control device 160 and the input/output device 170, a function of generating pointing position information based on a signal from the pointing position detecting sensor 130 (see FIG. 1), and a function of generating a selection pointing signal based on a signal from the pressure sensitive sensor 140 (see FIG. 1).

As information which is inputted/outputted between the input/output device 170 and the controlled equipment-side control part 310, the following information may be exemplified. That is, besides the pointing position information based on a pointing position detected by the pointing position detecting sensor 130, a selection pointing signal based on a signal detected by the pressure sensitive sensor 140, feedback information from the controlled equipment and the like, message information which the controlled equipment wants to transmit to the user, information for controlling a light source which may be provided to the haptic feedback controller and the like may be exemplified.

The haptic feedback controller 100 according to the embodiment 1 having such a constitution is preferably used in a mode where the haptic feedback controller 100 is directly incorporated into the controlled equipment or in a mode where the haptic feedback controller 100 is incorporated into other controller for controlling the controlled equipment.

FIG. 4 is a view for explaining one example of an application mode of the haptic feedback controller 100 according to the embodiment 1. The controlled equipment shown in FIG. 4 is equipment for editing images, music or the like (hereinafter, referred to as video/music editing equipment 300).

The video/music editing equipment 300 includes, as shown in FIG. 4, two haptic feedback controllers 100 on an operation panel 330, and images or music can be edited using these two haptic feedback controllers 100.

In the haptic feedback controller 100, the piezoelectric element 121 and the elastic body 122 which constitute the haptic feedback imparting device 120 has a ring shape and hence, as shown in FIG. 1 and FIG. 2, a space portion 160 is formed inside the haptic feedback imparting device 120. In incorporating such a haptic feedback controller 100 into the controlled equipment (video/music editing equipment 300 in the example shown in FIG. 4), it is preferable to provide a lid body 150 (see FIG. 4) which covers the space portion 160 of the haptic feedback imparting device 120. The provision of such a lid body 150 is also preferable from a viewpoint of appearance. That is, the space portion 160 of the haptic feedback imparting device 120 in the haptic feedback controller 100 is not visible from the outside with naked eyes.

Further, the piezoelectric element control device 160, the control part 180, the input/output device 170 and the like shown in FIG. 3 may be incorporated into the space portion 160.

Further, the video/music editing equipment 300 includes two haptic feedback controllers 100 in the example shown in FIG. 4. However, the number of haptic feedback controller 100 is not limited to two, and the number of haptic feedback controller 100 may be one, three or more depending on the video/music editing equipment.

The haptic feedback controller 100 according to the embodiment 1 can be used as follows. When a user moves his/her fingertip along the fingertip pointing path, that is, on the pointing position detecting sensor 130, the pointing position detecting sensor 130 detects a pointing position pointed by the fingertip and outputs a detection signal to the control part 180. The control part 180 generates pointing position information based on the detection signal from the pointing position detecting sensor 130, and outputs the pointing position information to the input/output device 170. The input/output device 170 outputs the pointing position information to the controlled equipment-side control part 310. Accordingly, the controlled equipment-side control part 310 performs a control corresponding to an operation mode of the video/music editing equipment 300 on that occasion.

The control corresponding to an operation mode may be, for example, a control which enables selection of a music number when the operation mode on that occasion is an operation mode for music number selection, a control which enables fast feeding when the operation mode on that occasion is an operation mode for performing fast feeding, or a control which enables rewinding when the operation mode on that occasion is an operation mode for performing rewinding.

Further, the controlled equipment-side control part 310 outputs, based on the pointing position information transmitted from the haptic feedback controller 100 and an operation mode of the controlled equipment-side control part 310 per se on that occasion, feedback information for controlling the piezoelectric element 121 to the haptic feedback controller 100.

The input/output device 170 of the haptic feedback controller 100 outputs, upon reception of inputting of feedback information from the controlled equipment-side control part 310, the received feedback information to the control part 180. The control part 180 outputs the feedback information to the piezoelectric element control device 160, and allows the piezoelectric element control device 160 to control the piezoelectric element 121.

Here, an operational example of the video/music editing equipment 300 in a mode where a music number is selected (music number selection mode) is explained. As a method of selecting the music number, a cursor is sequentially moved on a large number of music numbers which are displayed on a screen 320 of the video/music editing equipment 300 by scroll display, and a determination operation is performed when the cursor arrives at the desired music number so that the desired music number is selected.

In performing such a music number selecting operation using the haptic feedback controller 100, a fingertip is moved on the pointing position detecting sensor 130 in the predetermined direction, and the user pushes (presses) the pointing position detecting sensor 130 at a predetermined position with his/her fingertip. That is, when the user moves his/her finger on the pointing position detecting sensor 130 in the predetermined direction, a cursor sequentially moves on music numbers displayed on the screen 320 by scroll display, and when the cursor arrives at the desired music number, the user pushes the pointing position detecting sensor 130 (applying pressure to the pointing position detecting sensor 130) with his/her fingertip.

In such a music number selection mode, for an initial state, assume that the piezoelectric element control device 160 controls the piezoelectric element 121 so as to guide the fingertip in the predetermined direction at a constant speed in response to haptic feedback information from the controlled equipment-side control part 310. In such a state, when the user places his/her fingertip on the pointing position detecting sensor 130, the fingertip is moved while being guided on the pointing position detecting sensor 130 in the predetermined direction (clockwise direction).

The above-mentioned operation uses the principle of piezoelectric motor. Accordingly, the fingertip which is put on the pointing position detecting sensor 130 performs rotary movement along the piezoelectric element 121 and the elastic body 122. That is, the fingertip is moved such that the fingertip is guided in the clockwise direction on the pointing position detecting sensor 130.

Due to the movement of the fingertip in the clockwise direction, on the screen 320, the cursor is sequentially moved along with the movement of the fingertip on the music numbers displayed on the screen 320 by scroll display.

FIG. 5 is a view schematically showing one example of an operation of the haptic feedback controller 100 according to the embodiment 1. FIG. 5A is a view schematically showing a state of haptic feedback which the haptic feedback controller 100 imparts to a fingertip, and FIG. 5B is a view showing the movement of the cursor CSL on the screen 320 of the video/music editing equipment 300. First of all, as an initial state, assume that the haptic feedback controller 100 performs an operation of imparting haptic feedback for guiding the fingertip 10 in the clockwise direction to the fingertip (referred to as a fingertip guiding operation).

Here, assume that the fingertip is put on the pointing position detecting sensor 130 at a predetermined position P0 (initial position P0), the fingertip 10 is guided in the clockwise direction (direction indicated by an arrow A) from the position P0 due to the fingertip guiding operation. Here, on the screen 320 of the video/music editing equipment 300, the cursor CSL for selecting music number is sequentially moved in the direction indicated by an arrow C as shown in FIG. 5B.

Then, when the fingertip 10 arrives at a position P1 shown in FIG. 5A (assume that the cursor CSL is at a position immediately before the music number M2 at this point of time), the fingertip guiding operation is released and braking is applied to the movement of the fingertip so that the fingertip 10 is stopped at a position P2 (assume that the cursor CSL is at a position where the cursor CSL arrives at the music number M2 at this point of time). Here, the fingertip guiding operation can be released by controlling stopping of application of high frequency voltage to the piezoelectric element 121.

Here, when the music number M2 is not the desired music number, the user tries to further move his/her fingertip 10 in the clockwise direction from the position P2, that is, in the direction indicated by arrow A. Due to such an operation, the fingertip is again guided due to the fingertip guiding operation, and an operation similar to the above-mentioned operation is performed. That is, when the fingertip 10 arrives at a position P3 (assume that the cursor CSL is at a position immediately before a music number M3 at this point of time), the fingertip guiding operation is released and braking is applied to the movement of the fingertip so that the fingertip 10 is stopped at a position P4 (assume that the cursor CSL is at a position where the cursor CSL arrives at the music number M3 at this point of time).

Here, when the music number M3 is a desired music number, the user pushes the pointing position detecting sensor 130 with his/her fingertip 10 at such a position. Accordingly, the pressure sensitive sensor 140 (see FIG. 1 and FIG. 2) detects pressing of the pointing position detecting sensor 130 with the fingertip and outputs a detection signal to the control part 180. The control part 180 generates selection pointing information based on the detection signal from the pressure sensitive sensor 140, and the selection pointing information is imparted to the controlled equipment-side control part 310 so that the desired music number is selected.

Here, in FIG. 5A, a zone where the fingertip guiding operation is performed (for example, a zone ranging from P0 to P1, a zone ranging from P2 to P3 or the like) is referred to as a fingertip guiding operation zone, and a zone ranging from a position where the fingertip guiding operation is released to a position where the fingertip 10 is stopped (for example, a zone from P1 to P2, a zone from P3 to P4 or the like) is referred to as a braking zone.

As explained above, in selecting the music number, when the user merely places his/her fingertip 10 on the pointing position detecting sensor 130 of the haptic feedback controller 100, the fingertip 10 is naturally guided in the predetermined direction due to the fingertip guiding operation, and the cursor CSL is moved along with such guiding of the fingertip. Then, when the cursor CSL approaches the individual music number, the fingertip guiding operation is released and braking is applied to the movement of the fingertip 10, and when the cursor CSL arrives at the individual music number, the movement of the fingertip 10 is naturally stopped. By imparting haptic feedback such as the fingertip guiding operation or the release of the fingertip guiding operation to the fingertip 10 of the user, the user can easily and properly perform a music number selecting operation in a music number selection mode.

When the fingertip arrives at the predetermined position, that is, when the cursor CSL arrives at the individual music number, it may be also possible to impart haptic feedback which positively informs the user of the arrival of the fingertip 10 at the predetermined position. As such haptic feedback, haptic feedback such as "minute wiggling vibrations" or "minute clicking vibrations" may be exemplified. By imparting such haptic feedback to the fingertip 10, the user properly acquires that the fingertip 10 is at the selected position so that operability of the haptic feedback controller 100 can be further enhanced.

The operation of the haptic feedback controller 100 in the music number selecting operation mode has been explained heretofore. However, by setting various operation modes, the haptic feedback controller 100 can impart versatile haptic feedbacks to the fingertip 10 of the user in the respective operation modes.

For example, fast-feeding/rewinding operation modes are set such that fast-feeding is performed when the fingertip 10 is moved in the clockwise direction from a predetermined position (assuming the position P0 in FIG. 5A as such a predetermined position), and rewinding is performed when the fingertip 10 is moved in the counterclockwise direction from the predetermined position.

With respect to such fast-feeding/rewinding operation modes, in performing fast-feeding, a fast-feeding speed is set such that when the fingertip 10 is moved in the clockwise direction (direction indicated by an arrow A) from the position P0, a fast-feeding speed is increased along with the movement of the fingertip 10, and the fast-feeding speed becomes maximum at a position P4 in FIG. 5A, for example. On the other hand, in performing rewinding, a rewinding speed is set such that when the fingertip 10 is moved in the counterclockwise direction (direction indicated by an arrow B) from the position P0, the rewinding speed is increased along with the movement of the fingertip 10, and the rewinding speed becomes maximum at a position P10 in FIG. 5A, for example.

Further, in performing the fast-feeding operation, haptic feedback is imparted such that the closer the fingertip 10 approaches the position P4, the larger the amount of resistance the fingertip 10 feels. The haptic feedback imparted here is, for example, haptic feedback which is similar to feeling that the user perceives when the fingertip 10 is pulled back by a coil spring or the like. This haptic feedback becomes maximum at the position P4, and the fast-feeding speed becomes maximum at the position P4.

In the same manner, in performing the rewinding operation, haptic feedback is imparted such that the closer the fingertip 10 approaches the position P10, the larger the resistance the fingertip 10 feels. The haptic feedback imparted here is, in the same manner as the haptic feedback perceived at the time of fast-feeding, for example, haptic feedback which is similar to feeling that the user perceives when the fingertip 10 is pulled back by a coil spring or the like. This haptic feedback becomes maximum at the position P10, and the rewinding speed becomes maximum at the position P10.

In the fast-feeding/rewinding operation modes, such haptic feedback is imparted to the fingertip 10. Accordingly, in performing the fast-feeding operation or the rewinding operation, the user acquires the fast-feeding speed or the rewinding speed intuitively and hence, the fast-feeding/rewinding operation modes can be smoothly performed.

As the haptic feedback which can be used in the fast-feeding/rewinding operation modes, it may be possible to impart haptic feedback different from the above-mentioned haptic feedback.

For example, it may be also possible to impart the following haptic feedback. That is, when the user moves his/her fingertip in the clockwise direction so as to perform the fast-feeding operation, the haptic feedback which guides the fingertip at a high speed in the clockwise direction is imparted to the fingertip and, when the fingertip approaches a desired fast-feeding position in the midst of such a fast-feeding operation, the user feels resistance in the movement of his/her fingertip.

In the same manner, it may be also possible to impart the following haptic feedback. That is, when the user moves his/her fingertip in the counterclockwise direction so as to perform the rewinding operation, the haptic feedback which guides the fingertip at a high speed in the clockwise direction is imparted to the fingertip and, when the fingertip approaches a desired rewinding position in the midst of such a rewinding operation, the user feels resistance in the movement of his/her fingertip.

In the fast-feeding/rewinding operation modes, by imparting the above-mentioned respective haptic feedbacks to the fingertip, the user acquires a state of the fast-feeding operation or the rewinding operation based on a sense of touch of his/her fingertip and hence, the user can properly perform the fast-feeding operation or the rewinding operation.

Further, in a reproduction operation mode which reproduces music, it may be possible to impart haptic feedback which informs a user of a fact that the reproduction of the music almost is coming to the end. To be more specific, the haptic feedback is imparted such that when the user places his/her fingertip on the pointing position detecting sensor 130 in the course of the reproduction of the music, the fingertip is smoothly guided at a fixed speed. On the other hand, when the user places his/her fingertip on the pointing position detecting sensor 130 when the music comes to an end, the movement of the fingertip becomes gradually slow and the movement of the fingertip is stopped when the music is finished. In the reproduction operation mode, by imparting such haptic feedback to the fingertip, the user acquires a reproduction state based on the sense of touch of the fingertip.

With respect to the haptic feedback controller 100 according to the embodiment 1, in operating the haptic feedback controller 100 in the respective operation modes, by controlling the piezoelectric element corresponding to the respective states, it is possible to impart the haptic feedbacks having versatile expressive powers to the fingertip. Accordingly, the video/music editing equipment 300 into which the haptic feedback controller 100 according to the embodiment 1 is incorporated can easily perform an editing operation of images or music.

Further, the haptic feedback controller 100 according to the embodiment 1 can generate beams having a plurality of colors corresponding to pointing operations of the fingertip or contents of haptic feedback with respect to the pointing operations of the fingertip.

For example, a large number of light emitting diodes (hereinafter referred to as LEDs) which constitute light emitting bodies are arranged along the circumference of the fingertip pointing path, and in synchronism with an operation of the fingertip which moves along the fingertip pointing path, the LED arranged at a position corresponding to the position of the fingertip emits light.

A light emitting operation of the LED can be realized such that in response to pointing position information outputted from the control part 180 based on a detection signal from the pointing position detecting sensor 130, the LED corresponding to the position of the moving fingertip emits light.

Although the LED which emits light may be only the LED corresponding to the position of the fingertip at a current point of time, light emitting states of the LEDs from a starting position of the fingertip to a position of the fingertip at the current point of time may remain as they are. Due to such an operation, all LEDs corresponding to the fingertip pointing path which the fingertip traces are brought into a light emitting state and hence, the user can understand at a glance a range of pointing operation from a position of the fingertip pointing path at which the pointing operation starts to a position of the fingertip pointing path at which the pointing operation is finished.

FIG. 6 is a view showing the constitution of the haptic feedback controller 100 when the LEDs are arranged along the circumference of the fingertip pointing path. FIG. 6 is a view which corresponds to FIG. 1A, and a large number of LEDs 201 are arranged along the circumference of the fingertip pointing path. The respective LEDs 201 are arranged along the circumference of the fingertip pointing path corresponding to respective pointing position detecting portions of the pointing position detecting sensor, that is, the respective electrodes 130*a* (see the constitution surrounded by a broken-line frame F in FIG. 1C).

As described above, with the use of the haptic feedback controller 100 according to the embodiment 1, it is possible to provide the haptic feedback controller possessing versatile expressive powers.

Further, the haptic feedback controller 100 according to the embodiment 1 uses the principle of piezoelectric motor. Since the haptic feedback controller 100 according to the embodiment 1 uses the principle of piezoelectric motor, the haptic feedback controller 100 according to the embodiment 1 can enjoy various advantages that the piezoelectric motor possesses. For example, the piezoelectric motor exhibits excellent response characteristic, can change over the rotational direction thereof at a high speed, and exhibits high resolution in operation along the rotational direction. Due to such a constitution, the haptic feedback controller 100 according to the embodiment 1 is realized as the haptic feedback controller having these characteristics.

Further, different from a motor which makes use of an electromagnetic force, the piezoelectric motor does not use an electromagnetic force as a drive source. Accordingly, the haptic feedback controller 100 according to the embodiment 1 can be preferably used in applications which obviate the use of a magnetic force. Further, the piezoelectric motor does not use a belt transmission mechanism and hence, the haptic feedback controller 100 according to the embodiment 1 can acquire an advantageous effect that, as shown in FIG. 1, the haptic feedback controller 100 can decrease a size thereof in the thickness direction thus exhibiting a slim shape in appearance.

In the haptic feedback controller 100 according to the embodiment 1, the explanation has been made with respect to the example in which the electrostatic capacitance sensor is used as the pointing position detecting sensor 130 for detecting the pointing position of the fingertip. However, the pointing position detecting sensor 130 is not limited to the electrostatic capacitance sensor, and a pressure sensitive sensor, a photo sensor or the like can be also used as the pointing position detecting sensor 130.

Even when a pressure sensitive sensor is used as the pointing position detecting sensor, the pointing position can be properly detected based on a pressure which is applied when a user performs a tracing operation along the fingertip pointing path with his/her fingertip. Further, the pressure sensitive sensor can be formed into a thin plate shape in the same manner as the electrostatic capacitance sensor and hence, a total thickness of the haptic feedback controller can be decreased whereby it is possible to provide haptic feedback controller which is suitable for portable equipment deemed necessary to satisfy demand for reduction of thickness and miniaturization.

Further, by using an optical sensor as the pointing position detecting sensor, it is unnecessary to fix the sensor such as the electrostatic capacitance sensor, the pressure sensitive sensor to the elastic body and hence, the total thickness of the haptic feedback controller can be further decreased.

In the haptic feedback controller 100 according to the embodiment 1, a force which is applied to the fingertip is detected by a pressure sensitive sensor 140, and a detected signal is outputted as a kind of command signal of the user (a command indicative of the decision which is made by the user in performing a selecting operation or the like). However, it is possible to output the command signal of the user without using the pressure sensitive sensor 140.

For example, when the user performs a pointing operation with his/her fingertip using the pointing position detecting sensor (assuming the electrostatic capacitance sensor as the pointing position detecting sensor), the pointing position detecting sensor can detect that the fingertip is removed from the pointing position detecting sensor and hence, a signal indicative of the removal of the fingertip can be outputted as the command signal of the user.

Further, the input/output device 170 is provided for allowing the haptic feedback controller 100 to be directly used as a controller of the controlled equipment by connecting the haptic feedback controller 100 to the controlled equipment. Accordingly, when the haptic feedback controller is used in a state where the haptic feedback controller is incorporated into the controlled equipment at a time of manufacturing or shipping the controlled equipment, the haptic feedback controller 100 is operable even when the input/output device 170 is not provided as a constitutional element of the haptic feedback controller 100. Even when the haptic feedback controller 100 is used in a form that the haptic feedback controller 100 is incorporated into the controlled equipment at a time of manufacturing or shipping the controlled equipment, the haptic feedback controller 100 may include the input/output device 170 as well.

Further, as the controlled equipment, besides the above-mentioned video/music editing equipment 300, a television receiver set (hereinafter referred to as a TV), a family gaming machine, a radio-controlled model car, various kinds of vehicle-loaded equipment mounted on an automobile, various kinds of machine tools installed in a factory, medical equipment and the like may be exemplified. The haptic feedback controller according to the present invention can be used as controllers of these equipments.

With the use of the haptic feedback controller 100 according to the embodiment 1 as a controller of a TV, it is possible to perform a control of the TV more intuitively. For example, in adjusting left and right sound volume balance of stereo sounds, the resistance against the movement of the fingertip is increased at a negative-positive-zero position so that the user can understand that this position is the negative-positive-zero position intuitively. Further, in selecting a channel by moving his/her fingertip on the haptic feedback controller, the user can perceive click feeling each time the channel is changed or the rotational resistance is lowered when the fingertip passes a channel which the user cannot receive via broadcasting thus enhancing convenience when watching the TV.

Further, with the use of the haptic feedback controller 100 according to the embodiment 1 as a controller for performing the control of family-use gaming equipment, the user can perform the control of the gaming equipment more intuitively. For example, in a role playing game, it may be possible to impart haptic feedback where the user bounces back when the user bumps into a wall. Further, the user can acquire a more real reaction from the gaming equipment. For example, in a shooting game, when a player in the game is shot, it is possible to impart haptic feedback that the haptic feedback controller is vibrated or the like to the user. Further, in a ping pong game, at the time of hitting back a ping pong ball, the user can perceive a sense of touch while hitting back the ping pong ball and hence, the user can hit back the ping pong ball in the direction that the user desires thus enhancing the realistic sensation of the game.

Further, with the use of the haptic feedback controller 100 according to the embodiment 1 as a remote controller for performing a control of a radio-controlled model car, it is possible to perform the control of the radio-controlled model car more intuitively. For example, the user can acquire real feedback corresponding to an environment where the radio-controlled model car is placed such as a feedback in which the user loses a control of a steering wheel immediately after the radio-controlled model car enters a gravel road from a paved road.

Further, with the use of the haptic feedback controller 100 according to the embodiment 1 as a controller of vehicle-loaded equipment which is mounted on an automobile (for example, an air conditioning system, an audio video system, a navigation system or the like), the user can operate a control panel more intuitively.

For example, in adjusting left and right sound volume balance of stereo sounds, the resistance against the movement of the fingertip is increased at a negative-positive-zero position so that the user can understand that this position is the negative-positive-zero position intuitively and hence, the convenience in use of the control panel can be enhanced. Further, it is possible to impart various functions to the haptic feedback controller and hence, the number of button switches and the number of tab switches can be decreased so that the interior of the automobile can be simplified.

Further, with the use of the haptic feedback controller 100 according to the embodiment 1 as a controller for a machine tool or the like installed in a factory, the user can operate the machine tool more intuitively. For example, when the machine tool is a cutting machine, it is possible to provide feedback in which a fingertip of the user receives substantially no resistance when a work is being moved toward a cutting position, and the resistance is suddenly increased when the work approaches the cutting position and hence, the convenience in use of the cutting machine can be enhanced. Further, for example, the user can determine the cutting conditions while feeling a stress which a cutting tool receives and hence, it is possible to perform cutting always under optimum conditions in operations carried out thereafter whereby it is possible to enhance quality of products manufactured by cutting and to prolong a lifetime of the cutting tool.

Further, with the use of the haptic feedback controller 100 according to the embodiment 1 as a controller for medical equipment, the user can operate the medical equipment more intuitively. For example, it is possible to impart feedback in which a fingertip of the user receives resistance in advance when an endoscope is about to bump into a wall of an internal organ and hence, the convenience in use of the endoscope is enhanced.

Embodiment 2

A haptic feedback controller 101 according to an embodiment 2 has the constitution which allows the haptic feedback controller 101 to be preferably used as a menu selecting operation part of a mobile phone or the like. That is, to allow the haptic feedback controller 101 according to the embodiment 2 to be compatible with a pointing operation where the cushion of a fingertip (mainly a thumb) can be rotated to draw a small circle without largely changing a position of the fingertip, an outer diameter of the haptic feedback controller is set to approximately 5 mm to 20 mm.

FIG. 7 is a view for explaining one example of an application mode of the haptic feedback controller 101 according to the embodiment 2. The haptic feedback controller 101 according to the embodiment 2 is, as shown in FIG. 7, a haptic feedback controller for performing a control of a mobile phone 400 which constitutes controlled equipment.

With respect to the haptic feedback controller 101 according to the embodiment 2, as shown in FIG. 7, there is described an example in which the haptic feedback controller 101 is used as an operating part for performing menu selection or setting of selected menu in the mobile phone 400 (hereinafter referred to as a menu selecting/setting operation part) 410. The haptic feedback controller 101 according to the embodiment 2 substantially has the same constitution and functions as the haptic feedback controller 100 according to the embodiment 1 except for that these haptic feedback controllers 100, 101 differ in outer diameter. Further, the haptic feedback controller 101 according to the embodiment 2 is, in the same manner as the video/music editing equipment 300 explained in conjunction with FIG. 4, provided with a lid body 150 for covering a space portion of a haptic feedback imparting device 120 in the haptic feedback controller 101.

An application example of the haptic feedback controller 101 according to the embodiment 2 having such a constitution is explained. For example, in a state that a plurality of menus which the mobile phone has is displayed on a screen 420, a user can move a cursor on the plurality of menus displayed on the screen 420 sequentially by tracing a pointing position detecting sensor 130 of the haptic feedback controller 101 with a cushion of his/her thumb. At a point of time that the cursor arrives at a desired menu, the user pushes the haptic feedback controller 101 with his/her fingertip so that setting of the menu becomes possible.

Also in performing such an operation, it is possible to impart haptic feedback to the fingertip of the user in the same manner as the haptic feedback controller 100 according to the embodiment 1 so that the user can easily and properly perform the menu selecting operation (see FIG. 5, for example). When the cursor arrives at the individual menu, it is also possible to impart haptic feedback in which vibrations such as "minute wiggling vibrations" or "minute clicking vibrations", for example, are generated at such a position thus providing a mobile phone which exhibits excellent operability.

Further, the use of the haptic feedback controller 101 according to the embodiment 2 is not limited only to the mobile phone, and the haptic feedback controller 101 according to the embodiment 2 can be used in various portable information equipments. For example, the haptic feedback controller 101 according to the embodiment 2 can be also preferably used as an operation part of a portable digital audio player or the like.

Embodiment 3

FIG. 8 is a view showing the constitution of a haptic feedback controller 102 according to an embodiment 3. FIG. 8A is a plan view of the haptic feedback controller 102 according to the embodiment 3, and is a view corresponding to FIG. 1B. Further, FIG. 8B is a side view of the haptic feedback controller 102 according to the embodiment 3, and is a view corresponding to FIG. 1B. The haptic feedback controller 102 according to the embodiment 3 can use a side surface 122c of an elastic body 122 as a fingertip pointing path.

In the haptic feedback controller 102 according to the embodiment 3, as shown in FIG. 8, the elastic body 122 has a projecting portion 12d which extends downwardly such that the elastic body 22 can cover an edge surface 121a of a piezoelectric element 121. Here, the side surface 122c of the elastic body 122 forms a finger tip pointing path. Accordingly, a pointing position detecting sensor 130 is provided to the side surface 122c of the elastic body 122.

The pointing position detecting sensor 130 of the haptic feedback controller 102 according to the embodiment 3 differs from the pointing position detecting sensors of the haptic feedback controllers according to the embodiments 1, 2 only with respect to the mounting position of the pointing position detecting sensor. Accordingly, the pointing position detecting sensor 130 of the haptic feedback controller 102 according to the embodiment 3 can adopt the structure substantially equal to the structures of the pointing position detecting sensors 130 of the haptic feedback controllers according to the embodiments 1, 2 (see FIG. 1C).

Since the haptic feedback controller 102 according to the embodiment 3 has such a constitution, the haptic feedback controller 102 can be used in applications different from the applications in which the haptic feedback controllers 100, 101 according to the embodiments 1, 2 are used.

For example, when a controller (a remote controller or the like) for controlling controlled equipment has a disc shape or a cylindrical shape, or the controlled equipment per se has a disc shape or a cylindrical shape, the haptic feedback controller 102 according to the embodiment 3 can be preferably applicable to such a controller.

That is, by incorporating the haptic feedback controller 102 according to the embodiment 3 into the disc-shaped or cylindrical controller or the controlled equipment, the fingertip pointing path is formed on a side surface of the disc-shaped or cylindrical controller. Accordingly, it is possible to control the controlled equipment by performing a fingertip pointing operation on the side surface of the disc-shaped or cylindrical controller. Here, in controlling the controlled equipment, it is possible to impart haptic feedback to the fingertip in the same manner as the haptic feedback controllers according to the embodiment 1 or 2.

Although the haptic feedback controllers of the present invention have been explained in conjunction with the above-described respective embodiments, the present invention is not limited to the above-mentioned respective embodiments, and various modifications can be carried out without departing from the gist of the present invention.

For example, in the above-mentioned respective embodiments, the piezoelectric element 121 and the elastic body 122 are formed in an annular shape respectively. Here, the term "an annular shape" includes not only a circular shape but also an elliptical shape and an oblong shape. Further, when the piezoelectric element 121 and the elastic body 122 are formed in an annular shape, there may be a case where only a portion of the annular shape may be used as the fingertip pointing path.

Further, the piezoelectric element 121 and the elastic body 122 may be also formed linearly respectively. Here, the term "linearly" includes not only a straight line but also an arcuate line, a corrugated line and the like.

Further, although the elastic body 122 is formed into a comb shape consisting of the projecting portions 122a and the recessed portions 122b, the shape of the elastic body 122 is not limited to the comb shape.

Further, in the above-mentioned respective embodiments, the lid body 150 is provided for covering the space portion 160 of the haptic feedback imparting device 120. However, in place of the lid body 150 which covers the space portion 160, an operation button switch having a certain function may be used such that the operation button switch also functions as a lid body. That is, a pressure sensitive sensor may be arranged in the space portion 160 and a control signal may be generated by applying a pressure to the pressure sensitive sensor by way of the operation button switch. With the provision of such an operation button switch, the haptic feedback controller of the present invention can have more versatile functions thus further enhancing the convenience in use of the haptic feedback controller.

Further, the finger tip pointing path is formed on the upper end surface of the elastic body 122 in the haptic feedback controllers according to the embodiment 1, 2, while the finger tip pointing path is formed on the side surface 122c of the elastic body 122 in the haptic feedback controller according to the embodiment 3. However, the finger tip pointing path may be formed on both the upper end surface and the side surface of the elastic body 122.

Further, the outer diameter of the haptic feedback controller is set to approximately 20 mm to 120 mm with respect to the haptic feedback controller according to the embodiment 1, and is set to approximately 5 mm to 20 mm with respect to the haptic feedback controller according to the embodiment 2. However, the outer diameter of the haptic feedback controller is not limited to values which fall within such ranges, and it may be possible to manufacture a haptic feedback controller having an outer diameter smaller than 5 mm or an outer diameter larger than 120 mm.

Further, with the use of the haptic feedback controller of the present invention, it is possible to provide a completely novel message transmitting method. That is, in the haptic feedback controller, by allowing the haptic feedback controller to impart plural kinds of vibrations or plural kinds of resistances to the fingertip as haptic feedbacks to the fingertip, the haptic feedback controller of the present invention can transmit messages relating to language information to the user.

The message transmitting method using such haptic feedbacks can transmit the messages relating to language information to the user in a manner which completely differs from manners of conventional methods and hence, there is a possibility that the message transmitting method becomes a completely novel communication method. For example, the message transmitting method has a possibility of transmitting messages relating to the language information to a blind person in a more easily understandable manner. As such a method for transmitting the message relating to language information, a method in which a message relating to language information is once transformed into Morse signals or

Figure 1A:
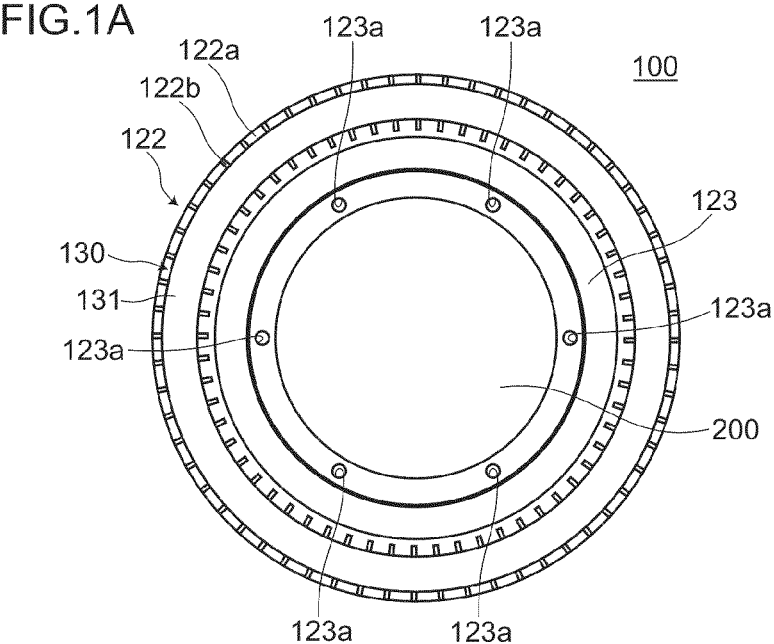
FIG. 1 A view for explaining a haptic feedback controller 100 according to an embodiment 1.
Figure 1B:
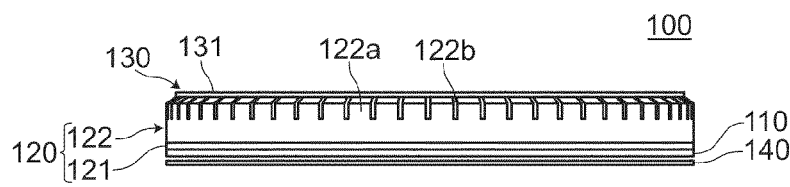
Figure 1C:
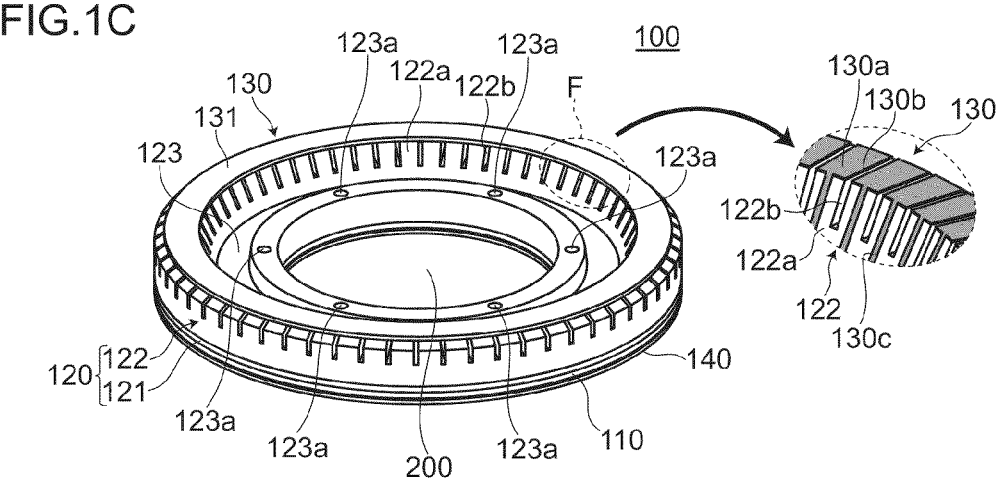
Figure 2:
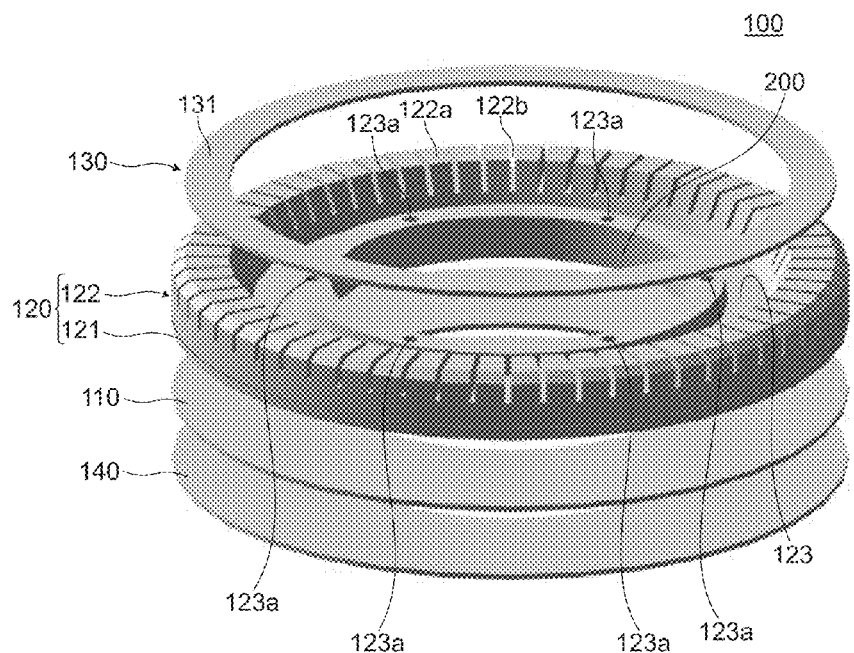
FIG. 2 An exploded perspective view for explaining the haptic feedback controller 100 according to the embodiment 1.
Figure 3:
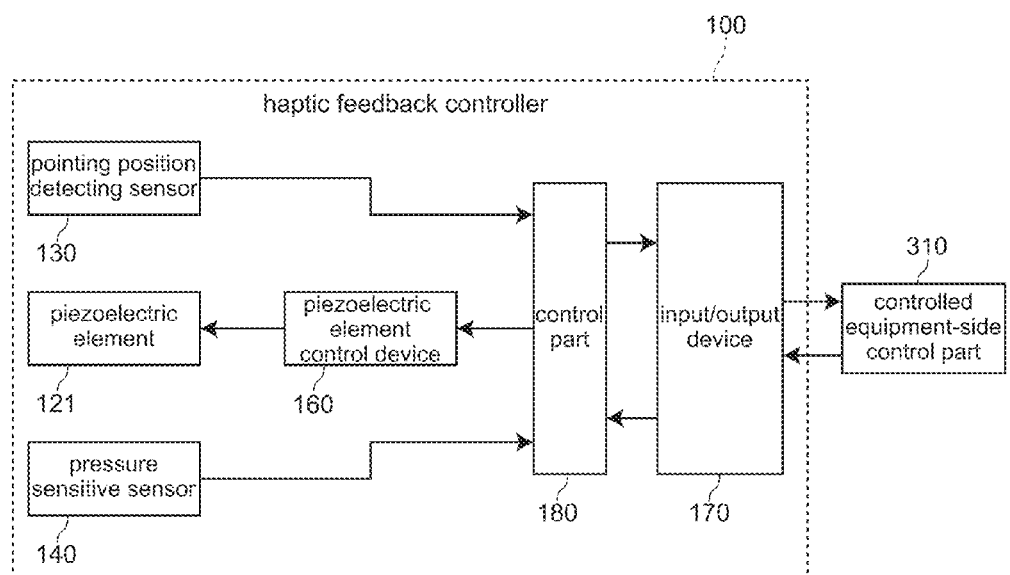
FIG. 3 A block diagram for explaining functions of the haptic feedback controller 100 according to the embodiment 1.
Figure 4:
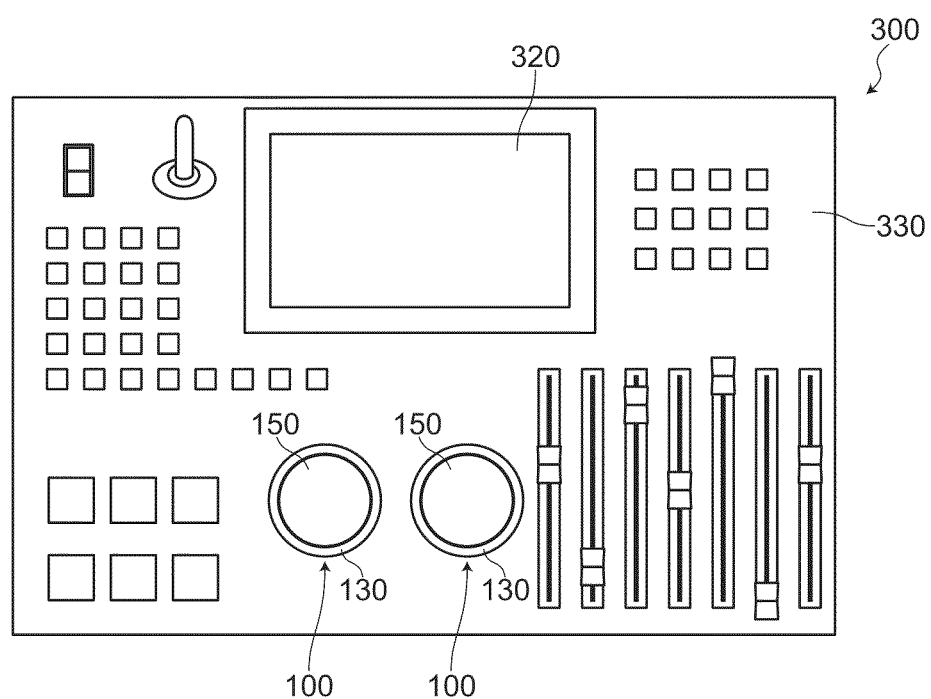
FIG. 4 A view for explaining one example of an application mode of the haptic feedback controller 100 according to the embodiment 1.
Figure 5A:
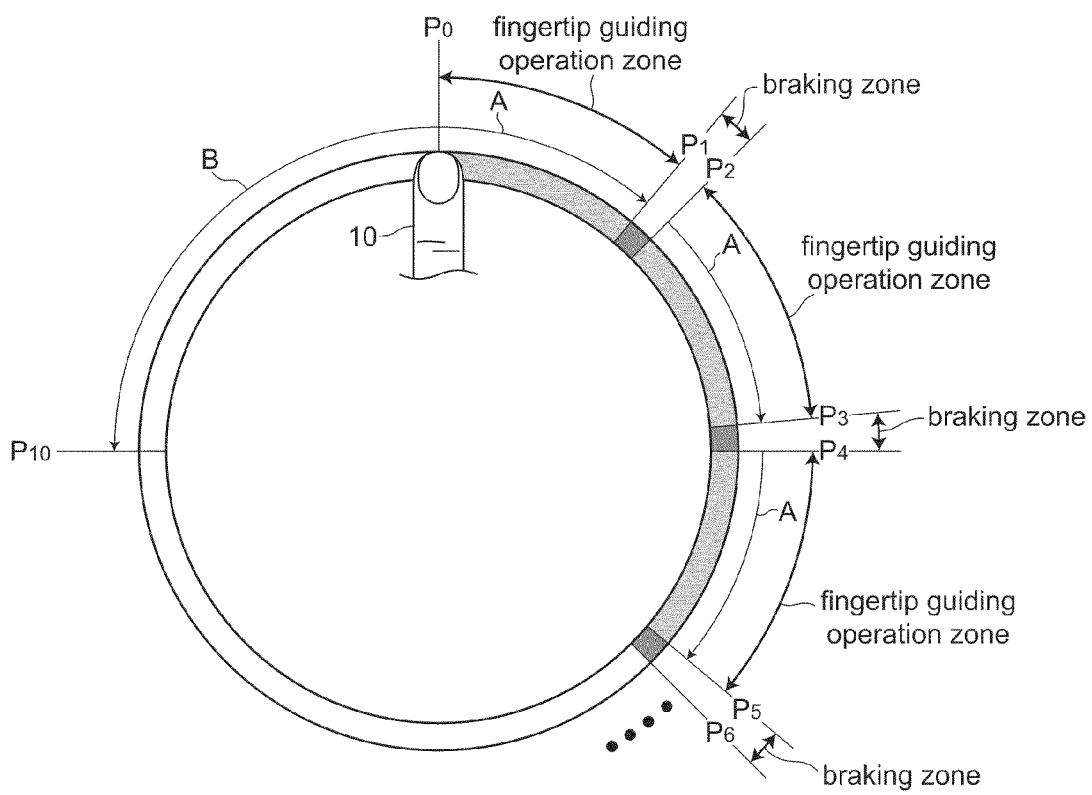
FIG. 5 A view schematically showing one example of an operation of the haptic feedback controller according to the embodiment 1.
Figure 5B:
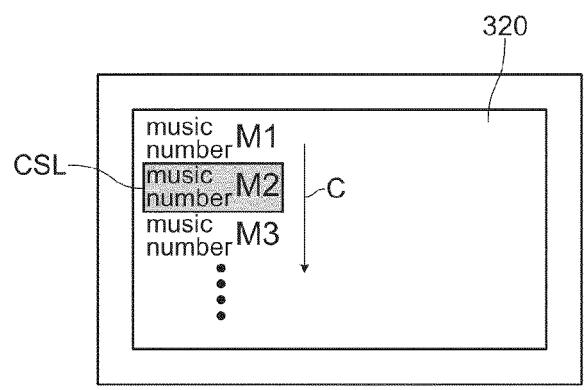
Figure 6:
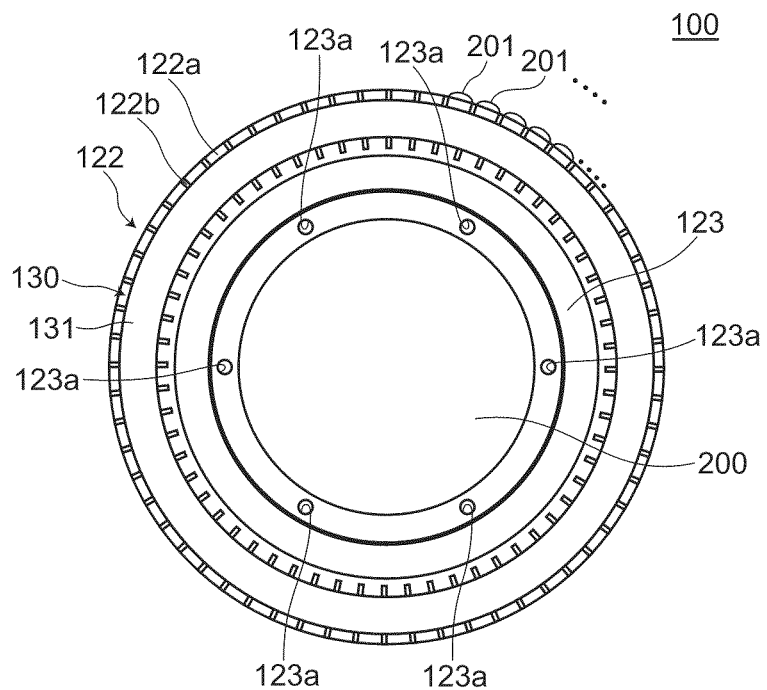
FIG. 6 A view showing the constitution of the haptic feedback controller when LEDs are arranged along the circumference of a fingertip pointing path.
Figure 7:
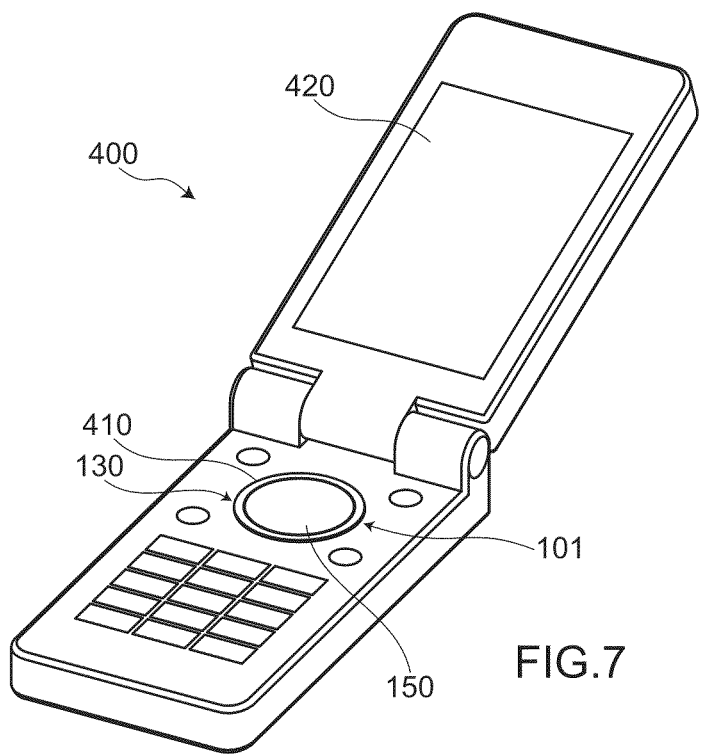
FIG. 7 A view for explaining one example of an application mode of a haptic feedback controller 101 according to an embodiment 2.
Figure 8A:
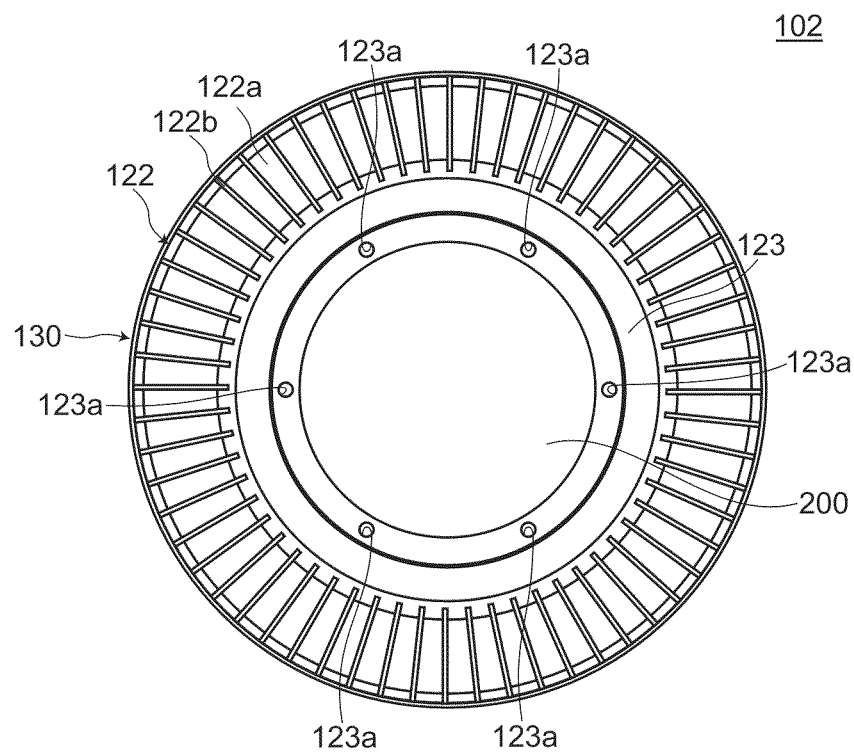
FIG. 8 A side view of a haptic feedback controller 102 according to an embodiment 3.
Figure 8B:
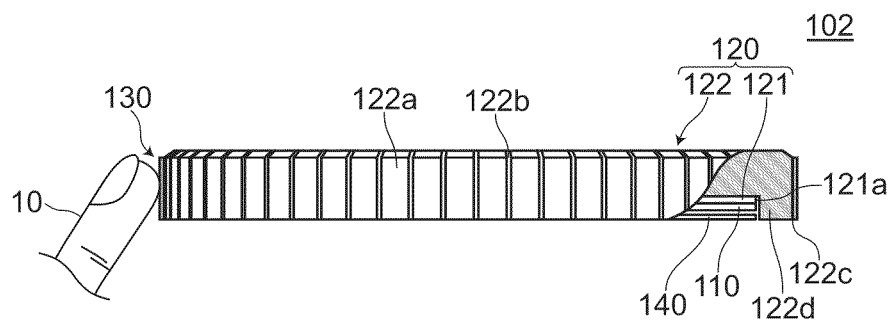
Figure 9A:
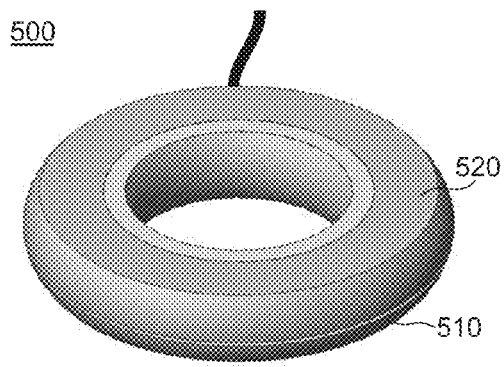
FIG. 9 A constitutional view for explaining a conventional haptic feedback controller 500.
Figure 9B:
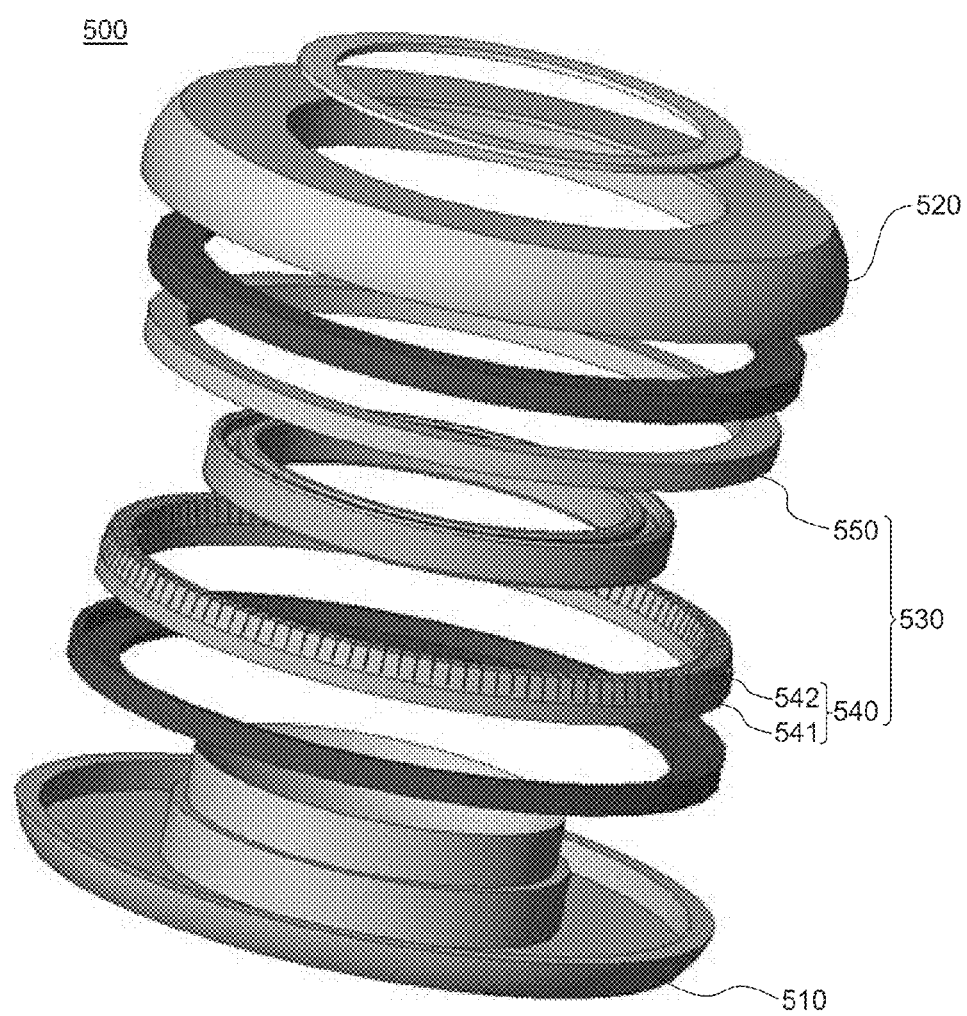
Figure 10:
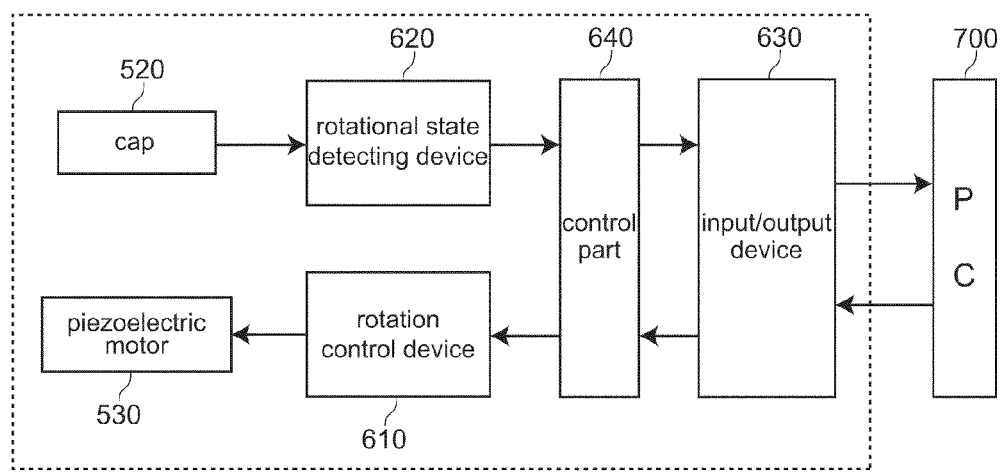
FIG. 10 A block diagram for explaining functions of the conventional haptic feedback controller 500.

DESCRIPTION OF THE REFERENCE NUMERALS AND SIGNS 100, 101, 102: haptic feedback controller
110: base
120: haptic feedback imparting device
121: piezoelectric element
122: elastic body
122a: projecting portion of elastic body
122b: recessed portion of elastic body
122c: side surface of elastic body
130: pointing position detecting sensor
130a: electrode
130b: gap between electrodes
130c: position detecting signal output terminal
140: pressure sensitive sensor
160: piezoelectric element control device
170: input/output device
200: space portion
201: LED
300: video/music editing equipment
400: mobile phone

The invention claimed is:

1. A haptic feedback controller for controlling controlled equipment in response to a pointing operation performed by a user's finger along a predetermined pointing path, and for imparting haptic feedback corresponding to the pointing operation to the finger, the haptic feedback controller comprising:

a pointing position detecting sensor which is arranged along the predetermined pointing path and is configured to detect a pointing position of the finger when the pointing operation is performed;

a haptic feedback imparting device including an elastic body arranged along the predetermined pointing path and a piezoelectric element fixed to the elastic body for generating a vibration corresponding to a high frequency voltage when the high frequency voltage is applied to the piezoelectric element, and the haptic feedback imparting device configured to impart the haptic feedback to the finger through the vibration generated by the piezoelectric element by the intermediary of the elastic body; and a piezoelectric element control device which is configured to control the piezoelectric element based on feedback information outputted from the controlled equipment.

2. A haptic feedback controller according to claim 1, wherein the pointing position detecting sensor is an electrostatic capacitance sensor which is fixedly mounted on the elastic body, and is configured to detect the pointing position of the finger when the pointing operation is performed with the finger in contact with the pointing position detecting sensor.

3. A haptic feedback controller according to claim 1, wherein the pointing position detecting sensor is a pressure sensitive sensor which is fixedly mounted on the elastic body, and is configured to detect the pointing position of the finger when the pointing operation is performed with the finger in contact with the pointing position detecting sensor.

4. A haptic feedback controller according to claim 1, wherein the pointing position detecting sensor is a photo sensor which is configured to optically detect the finger when the pointing operation is performed.

5. A haptic feedback controller according to claim 1, wherein the haptic feedback controller further includes an input/output device for outputting pointing position information based on the pointing position detected by the pointing position detecting sensor and receiving the feedback information outputted from the controlled equipment.

6. A haptic feedback controller according to claim 1, wherein the predetermined pointing path is annular, and the piezoelectric element and the elastic body have an annular shape corresponding to the predetermined pointing path.

7. A haptic feedback controller according to claim 1, wherein the predetermined pointing path is linear, and the piezoelectric element and the elastic body are linear corresponding to the predetermined pointing path.

8. A haptic feedback controller according to claim 1, wherein the predetermined pointing path is arranged on an upper end surface of the elastic body, and the pointing position detecting sensor is fixed to the upper end surface of the elastic body.

9. A haptic feedback controller according to claim 1, wherein the predetermined pointing path is arranged on a side surface of the elastic body, and the pointing position detecting sensor is fixed to the side surface of the elastic body.

10. A haptic feedback controller according to claim 1, further comprising a pressure sensitive sensor configured to detect a pressure applied to the pressure sensitive sensor for performing the pointing operation at a predetermined position on the predetermined pointing path and to output a signal corresponding to the detected pressure.

11. A haptic feedback controller according to claim 6, wherein the piezoelectric element and the elastic body having the annular shape form a space inside the haptic feedback imparting device, and the piezoelectric element control device is disposed in the space.

12. A haptic feedback controller according to claim 1, wherein the piezoelectric element is arranged along the predetermined pointing path.

13. A haptic feedback controller according to claim 1, wherein
  the pointing position detecting sensor is fixedly mounted on a surface of the elastic body, and
  the haptic feedback imparting device is configured to impart the haptic feedback to the finger via the vibration generated by the piezoelectric element through the elastic body and the pointing position detecting sensor.

14. A haptic feedback controller according to claim 13, further comprising:
  a surface member configured to cover a surface of the pointing position detecting sensor.

15. A haptic feedback controller according to claim 1, wherein the haptic feedback includes at least one selected from the group consisting of:
  haptic feedback for guiding the finger in a predetermined direction along the predetermined pointing path,
  haptic feedback for imparting a feeling of resistance to movement of the finger in the predetermined direction along the predetermined pointing path, and
  haptic feedback for informing the user that the finger points at a predetermined position on the predetermined pointing path.

16. A haptic feedback controller according to claim 1, wherein the haptic feedback includes at least one selected from the group consisting of:
  haptic feedback for guiding the finger in a predetermined direction along the predetermined pointing path, and
  haptic feedback for imparting a feeling of resistance to movement of the finger in the predetermined direction along the predetermined pointing path.

* * * * *